United States Patent [19]

Smith, Jr.

[11] Patent Number: 4,631,179
[45] Date of Patent: Dec. 23, 1986

[54] PROCESS FOR THE PRODUCTION OF SILICON CARBIDE BY THE PYROLYSIS OF A POLYCARBOSILANE POLYMER

[75] Inventor: Troy L. Smith, Jr., Baton Rouge, La.

[73] Assignee: Ethyl Corporation, Richmond, Va.

[21] Appl. No.: 738,445

[22] Filed: May 28, 1985

[51] Int. Cl.$^4$ .............................................. C01B 31/36
[52] U.S. Cl. ...................................... 423/345; 501/88
[58] Field of Search ........................... 423/345; 501/88

[56] References Cited

U.S. PATENT DOCUMENTS

| | | | |
|---|---|---|---|
| 4,052,430 | 10/1977 | Yajima et al. | 252/448.2 |
| 4,100,233 | 7/1978 | Yajima et al. | 423/345 |
| 4,105,455 | 8/1978 | Koga et al. | 423/345 |
| 4,159,259 | 6/1979 | Yajima et al. | 528/14 |
| 4,220,600 | 9/1980 | Yajima et al. | 556/434 |
| 4,283,376 | 8/1981 | Yajima et al. | 423/345 |
| 4,374,793 | 2/1983 | Koga et al. | 501/88 |

OTHER PUBLICATIONS

Weyenberg and Nelson, Platinum-Catalyzed Reactions of Silacyclobutanes and 1,3-Disilacyclobutanes, J. Org. Chem., vol. 30, pp. 2618–2621 (1965).
Bamford, Lovie, and Watt, Preparation and Properties of Polysilmethylenes: Use of Various Compounds of Group VIII Metals as Catalysts, J. Chem. Soc. (C) 1966, pp. 1137–1140.
Curtis L. Schilling, Jr., "Polycarbosilane Precursors for Silicon Carbide", *Ceramic Bulletin*, vol. 62, No. 8, 1983, pp. 912–915.

*Primary Examiner*—John Doll
*Assistant Examiner*—Jackson Leeds
*Attorney, Agent, or Firm*—Donald L. Johnson; John F. Sieberth

[57] ABSTRACT

Silicon carbide production by pyrolysis of polycarbosilane polymers formed by prior art methods is fraught with defects. These can be obviated by utilizing as the polycarbosilane polymer, a poly(silmethylene) formed by polymerizing 1,3-disilacyclobutane with a ring-opening catalyst of a Group VIII element of atomic number 44 or above, preferably a Pt-containing catalyst, in an inert liquid medium and under an inert atmosphere. At pyrolysis temperatures of at least about 900° C., silicon carbide in a crystalline state is formed. The poly(silmethylene) may be molded or shaped into various forms such as fibers before being subjected to the pyrolysis.

17 Claims, No Drawings

PROCESS FOR THE PRODUCTION OF SILICON CARBIDE BY THE PYROLYSIS OF A POLYCARBOSILANE POLYMER

TECHNICAL FIELD

This invention relates to an improved process for producing silicon carbide in various forms or shapes, such as fiber, filament, flake, powder, film, coating, foamed body, and the like.

BACKGROUND

Silicon carbide has been formed heretofore by pyrolysis of polycarbosilane polymers. See for example U.S. Pat. Nos. 4,052,430, 4,100,233, and 4,159,259 to Yajima et al. However, as the patentees point out in their subsequent U.S. Pat. Nos. 4,220,600 and 4,283,376, there are a number of defects in such earlier processes. They indicate, for example, that for satisfactory results the polymer must be formed in either a pressure reactor or a circulating-type apparatus which permits recycling. In the case of the pressure reactor they note that the polymerization must be carried out at a temperature of 400° to 470° C. and a pressure of 80 to 110 atmospheres for 10 to 15 hours, that the provision of pressure-resistant equipment and measures against the danger of fire are essential, and that the method is not suitable for mass production.

They point out that in the case of the circulating-type apparatus the equipment is extensive, recycle of lower molecular weight products is necessary, the temperature must be raised to as high as 600° to 800° C., and the reaction time must be as long as 20 to 50 hours.

In describing the defects associated with the process described in their U.S. Pat. No. 4,100,233, Yajima et al. point out that it is essential to perform the step of removing low molecular weight compounds from the polycarbosilane polymer before spinning the polymer into fibers, that the resultant polycarbosilane fibers obtained in the process are so brittle that they are difficult to handle, that the tensile properties of these fibers are poor, and that breakage of these fibers tends to occur in the final firing step.

Consequently, after making extensive investigations to remove the defects of the prior art, Yajima et al. resorted in U.S. Pat. Nos. 4,220,600 and 4,283,376 to the inclusion of siloxane bonds in the polycarbosiloxane polymer by including a phenyl-substituted polyborosiloxane in the polymerization mixture.

Still other drawbacks exist in conventional processes for producing silicon carbide by pyrolysis of polycarbosilane polymers. For instance, low yields of the silicon carbide are often experienced. And the product often has an undesirably high impurity content. In fact, it appears that the highest reported yield based on thermal gravimetric analysis is 60%, and this material has been shown to have excess carbon as well as $SiO_2$ impurities.

THE INVENTION

Pursuant to this invention, substantial improvements are achievable in the production of silicon carbide by processes in which pyrolysis of polycarbosilane polymers is employed. The need to form the polycarbosilane polymer at high temperature and pressures has been eliminated. The need to use recycle in the polymerization or to separate low molecular weight polycarbosilane from the polymer before conducting the pyrolysis has likewise been eliminated. And it has been found possible to produce silicon carbide of high purity in yields of 85% and above.

To accomplish these improvements the polycarbosilane polymer utilized in the pyrolysis is a poly(silmethylene) formed by polymerizing 1,3-disilacyclobutane with a ring-opening catalyst of a Group VIII element of atomic number 44 or above, in an inert liquid medium and under an inert atmosphere. In other words, the catalyst contains one or more of the elements Ru, Rh, Pd, Os, Ir, Pt, which are sometimes referred to as the platinum metals—see Latimer and Hildebrand, *Reference Book of Inorganic Chemistry*, The Macmillan Company, New York, copyrighted 1940, page 412.

Poly(silmethylene) has the formula $\mathrm{-\!\!\!\!-[H_2SiCH_2]\!\!\!\!-}_n$ where n is the degree of polymerization. The poly(silmethylene) used in the pyrolysis should be high enough in molecular weight as to exist as a viscous liquid or solid at room temperature. And in most cases it should be a melt processable solid, although this is not essential when producing randomly shaped silicon carbide.

A wide variety of ring-opening catalysts are suitable for use in the process. Many of them are known to convert silacyclobutanes and 1,3-disilacyclobutanes to polycarbosilane polymers. See for example, the work reported by Weyenberg and Nelson in *J. Org. Chem.* 1965, 30 2618-21 and by Bamford, Lovie, and Watt in *J. Chem. Soc.* (C), 1966, 1137-40. Thus use may be made of platinum on charcoal, chloroplatinic acid, di-$\mu$-chlorodichlorobis(cyclohexene)diplatinum(II), (decene)$_2$Pt$_2$Cl$_4$, (Et$_2$S)$_2$PtCl$_2$, PtBr$_2$, (Bu$_3$P)$_2$Pt$_2$Cl$_4$, (Bu$_3$P)$_2$PtPdCl$_4$, (Ph$_3$P)$_2$PtMe$_2$, (Pr$_3$As)$_2$PtCl$_2$, (Pr$_3$P)$_2$PtCl$_2$, PdBr$_3$, PdCl$_2$, (Ph$_3$P)$_2$PtCl$_2$, RuCl$_3$.3-H$_2$O, Ir(OH)$_4$, (Me$_3$P)$_2$PtMeBr, Na$_2$PtCl$_6$.6H$_2$O, (Et$_3$P)$_2$Pd$_2$Cl$_4$, PtI$_4$, and the like. In general, the catalysts in which the metal constituent is platinum itself are the most active and are preferred. Particularly useful are hydrates of $H_2PtCl_6$, such as $H_2PtCl_6.6H_2O$, and diene platinum dichlorides such as (1,5-cyclooctadiene) platinum (II) dichloride.

The polymerization is conducted in inert liquid media such as one or a mixture of paraffinic hydrocarbons, cycloparaffinic hydrocarbons, aromatic hydrocarbons, chloroalkanes, chloroaromatic hydrocarbons, linear ethers, cyclic ethers, and the like.

The polymerization reaction should be conducted in an inert atmosphere, namely under vacuum or under an inert gas such as argon, nitrogen, carbon monoxide, helium, neon, krypton or the like.

Polymerization temperatures need not be particularly high. Excellent results are achieved in the range of 75° to 120° C. but in general, the polymerizations may be performed at temperatures in the range of about 0° to about 200° C. In fact, temperatures outside this range may prove feasible. The amount of catalyst used likewise may be varied, but usually will fall within the range of from 0.001 to 10 mol percent based on the 1,3-disilacyclobutane employed. Polymerization times will of course vary depending upon the activity of the catalyst, the polymerization temperature, and the level of catalyst employed. Generally speaking, the polymerization time is directly proportional to catalyst level and inversely proportional to polymerization temperature.

As is well known, the pyrolysis should be conducted in an inert environment at a temperature above 800° C. and may range as high as 2,000° C. or more. Infrared studies have indicated that the silicon carbide structure formed in the pyrolysis of poly(silmethylene) produced in accordance with this invention begins to change from the amorphous state to a crystalline state at about 900° C.

The following examples are illustrative of the invention and its advantages.

EXAMPLE 1

To 1.0 gram of 1,3-disilacyclobutane in 20 mL of heptane is added 4.9 mg of $H_2PtCl_6.6H_2O$ in 20 μL (0.1 mol %) of isopropyl alcohol. This is then sealed in an evacuated ampoule at −196° C. and heated in an oil bath at 75° C. for 24 hours. The contents are then removed and filtered through a fritted polytetrafluoroethylene filter and the volatiles (heptane, isopropyl alcohol, water) removed by vacuum flashing to yield a viscous liquid or a clear cake that has been shown to have a linear polycarbosilane structure. This material was then pyrolyzed at 900° C. under argon for 1 hour to form silicon carbide in 85% yield. Thermal gravimetric analysis of the polycarbosilane material showed a weight loss of 10.1% at 900° C. under argon. The infrared analysis of the material at 25° C., 500° C., 700° C., and 900° C. in KBr discs showed that at 500° C., loss of SiH and CH is just beginning. At 700° C. nearly all of the hydrogen has been lost. And at 900° C., the SiC structure is beginning to change from the amorphous state to a crystalline state as evidenced by the shift of the SiC adsorption frequency shift to a higher reciprocal wavenumber.

EXAMPLES 2-7

Using the general procedure as in Example 1, the poly(silmethylene) was produced by polymerizing the 1,3-silacyclobutane under the following conditions:

| Solvent | Temp °C. | Catalyst | Catalyst Concentration |
|---------|----------|----------|------------------------|
| Heptane | 75 | $H_2PtCl_6$ | 1 g/10 mL |
| Heptane | 75 | $CODPtCl_2$* | 1 g/10 mL |
| Toluene | 75 | $H_2PtCl_6$ | 1 g/10 mL |
| Heptane | 100 | $H_2PtCl_6$ | 1 g/10 mL |
| Toluene | 100 | $H_2PtCl_6$ | 1 g/20 mL |
| Toluene | 100 | $CODPtCl_2$* | 1 g/10 mL |

$CODPtCl_2$ = (1,5-cyclooctadiene)platinum (II) chloride

The poly(silmethylene) polymer may be molded or shaped into various forms before being subjected to the pyrolysis. For example, it may be spun or drawn into fibers by conventional techniques to enable the pyrolytic production of silicon carbide fibers and filaments. Similarly, by applying a film or coating of the polymer to a suitable substrate, articles coated with silicon carbide may be formed upon pyrolysis. Pyrolysis of foamed poly(silmethylene) yields foamed silicon carbide structures.

Useful applications of silicon carbide are of course well known and include use as abrasives, semiconductors, reinforcing agents for metals and plastics, temperature-resistant ceramics, refractory coatings, and the like.

This invention is susceptible to considerable variation in its practice. Thus it is not intended that this invention be limited by the illustrative description herein presented of the best modes presently contemplated for its practice. Rather what is intended to be covered is the subject matter set forth in the ensuing claims and the equivalents thereof available as a matter of law.

What is claimed is:

1. In a process of producing silicon carbide by pyrolysis of a polycarbosilane polymer, the improvement which comprises utilizing as the polycarbosilane polymer a moldable or shapeable poly(silmethylene) formed by polymerizing 1,3-disilacyclobutane with a ring-opening catalyst of a Group VIII element of atomic number 44 or above, in an inert liquid medium and under an inert atmosphere.

2. A process of claim 1 in which the Group VIII element in the ring-opening catalyst is platinum.

3. A process of claim 1 in which the ring-opening catalyst as charged to the system is $H_2PtCl_6.6H_2O$.

4. A process of claim 1 in which the ring-opening catalyst as charged to the system is a diene platinum (II) dichloride.

5. A process of claim 1 in which the ring-opening catalyst as charged to the system is (1,5-cyclooctadiene)platinum (II) dichloride.

6. A process of claim 1 in which the pyrolysis is conducted at a temperature of at least about 900° C. so that silicon carbide in a crystalline state is formed.

7. A process of claim 1 in which the poly(silmethylene) is molded or shaped prior to the pyrolysis and the pyrolysis is performed on the molded or shaped poly(silmethylene).

8. A process of claim 1 in which the poly(silmethylene) is spun or drawn into a fiber prior to the pyrolysis and the pyrolysis is performed on the poly(silmethylene) fiber.

9. A process of claim 1 in which the Group VIII element in the ring-opening catalyst is platinum and in which the pyrolysis is conducted at a temperature of at least about 900° C. so that silicon carbide in a crystalline state is formed.

10. A process of claim 1 in which the Group VIII element in the ring-opening catalyst is platinum and in which the poly(silmethylene) is molded or shaped prior to the pyrolysis and the pyrolysis is performed on the molded or shaped poly(silmethylene).

11. A process of claim 1 in which the Group VIII element in the ring-opening catalyst is platinum and in which the poly(silmethylene) is spun or drawn into a fiber prior to the pyrolysis and the pyrolysis is performed on the poly(silmethylene) fiber.

12. A process of claim 1 in which the Group VIII element in the ring-opening catalyst is platinum, in which the poly(silmethylene) is molded or shaped prior to the pyrolysis and the pyrolysis is performed on the molded or shaped poly(silmethylene), and in which the pyrolysis of the molded or shaped poly(silmethylene) is conducted at a temperature of at least about 900° C. so that silicon carbide in a crystalline state is formed.

13. A process of claim 12 in which the ring-opening catalyst as charged to the system is a hydrate of $H_2PtCl_6$.

14. A process of claim 12 in which the ring-opening catalyst as charged to the system is a diene platinum (II) dichloride.

15. A process of claim 1 in which the Group VIII element in the ring-opening catalyst is platinum, in which the poly(silmethylene) is spun or drawn into a fiber prior to the pyrolysis and the pyrolysis is performed on the poly(silmethylene) fiber, and in which the pyrolysis of the poly(silmethylene) fiber is conducted at a temperature of at least about 900° C. so that silicon carbide in a crystalline state is formed.

16. A process of claim 14 in which the ring-opening catalyst as charged to the system is a hydrate of $H_2PtCl_6$.

17. A process of claim 14 in which the ring-opening catalyst as charged to the system is a diene platinum (II) dichloride.

* * * * *

UNITED STATES PATENT AND TRADEMARK OFFICE
CERTIFICATE OF CORRECTION

PATENT NO. : 4,631,179

DATED : December 23, 1986

INVENTOR(S) : Troy L. Smith, Jr.

It is certified that error appears in the above-identified patent and that said Letters Patent is hereby corrected as shown below:

Abstract, line 10, reads "carbride" and should read
-- carbide --.

Signed and Sealed this

Thirty-first Day of March, 1987

Attest:

DONALD J. QUIGG

Attesting Officer

Commissioner of Patents and Trademarks